Patented Oct. 20, 1925.

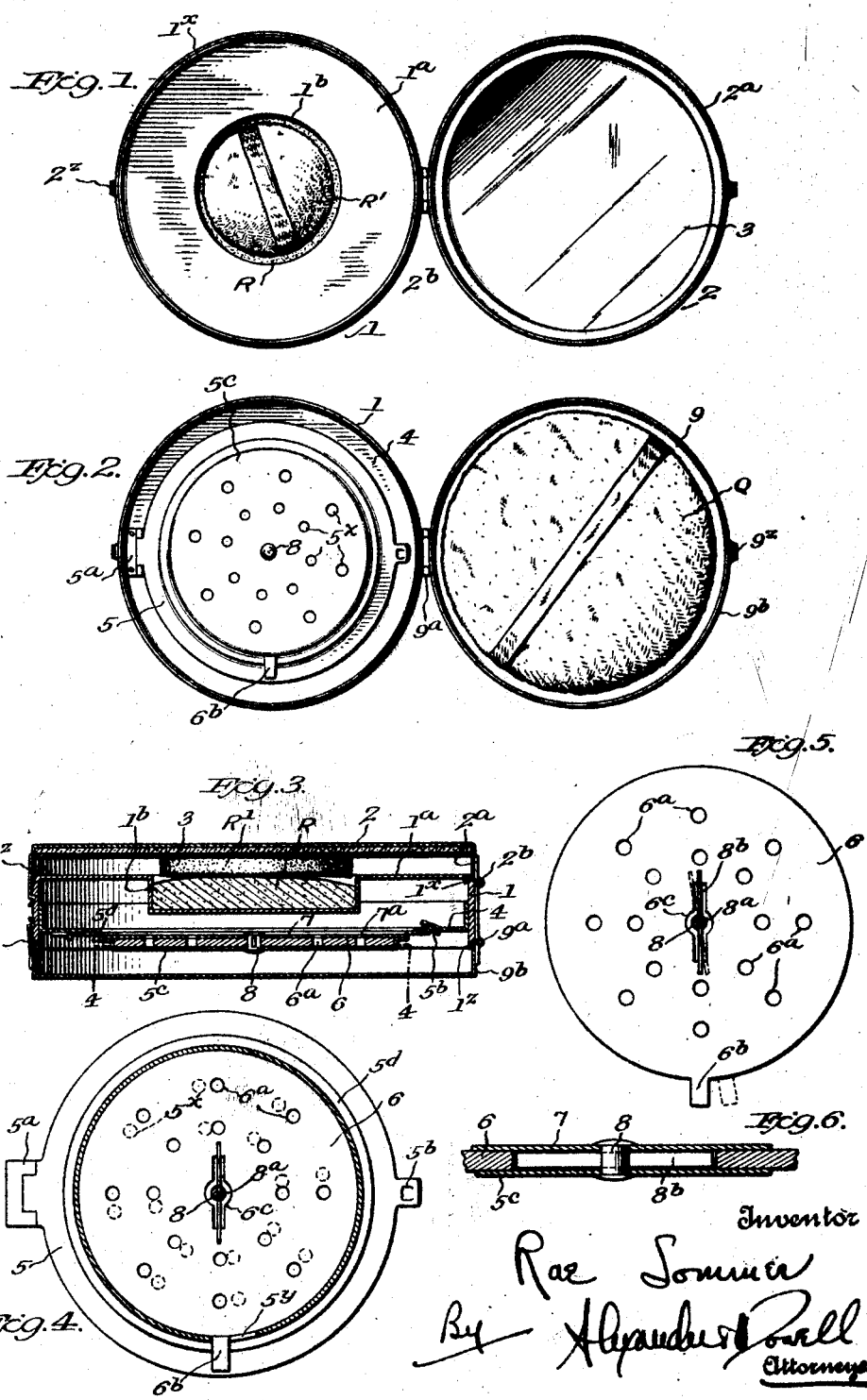

1,558,407

UNITED STATES PATENT OFFICE.

RAE SOMMER, OF CHICAGO, ILLINOIS.

VANITY CASE.

Application filed November 24, 1924. Serial No. 752,028.

*To all whom it may concern:*

Be it known that I, RAE SOMMER, a citizen of the United States, residing at Chicago, in the county of Cook and State of Illinois, have invented certain new and useful Improvements in Vanity Cases; and I hereby declare that the following is a full, clear, and exact description thereof, reference being had to the accompanying drawings, which form part of this specification.

This invention is a novel improvement in compacts or vanity cases, and the principal object thereof is to provide a novel compact or vanity case embodying certain novel features of construction and combinations of parts as hereinafter described.

I will explain the invention with reference to the accompanying drawing, which illustrates one practical embodiment thereof, to enable others to adopt and use the same, and will summarize in the claims the novel features of construction and novel combinations of parts, for which protection is desired.

In said drawings:

Figure 1 is a top plan view of my novel vanity case, showing same opened.

Figure 2 is a bottom plan view showing same opened.

Figure 3 is a longitudinal section through the vanity case, closed.

Figure 4 is a section on the line 4—4 Figure 3, looking upwardly.

Figure 5 is a detail view of the perforated disk detached.

Figure 6 is an enlarged section on the line 6—6, Figure 2.

As shown in the drawings, my novel compact or vanity case preferably comprises a cylindrical casing 1, formed of pressed sheet metal such as brass or other material, said cylindrical casing being preferably relatively thin, but may be of any desired thickness, and is open at the bottom but closed at its top by means of a top plate $1^a$. At the center of the top plate $1^a$ of the casing 1 is a pocket $1^b$ which is preferably pressed into the top $1^a$, to form a rouge cup, adapted to receive and retain therein a cake of rouge R and a rouge-puff R', as shown in Figures 1 and 3.

The casing 1 is provided with a hinged cylindrical cover 2, having sides $2^a$, said cover being hinged as at $2^b$, to the casing 1, in any desired manner. On the under side of the cover 2 is a mirror 3, which may be held in place in the cover by means of a glue or other suitable means so that when the cover is thrown open the mirror 3 will be displayed therein. Cover 2 is preferably of same overall diameter as casing 1, but is of less depth, and preferably the upper edge of the casing 1 is preferably in-set, as at $1^x$, an amount equal to the thickness of the material of cover 2, so that when the cover is closed the sides of the cover 2 will be flush with the sides of the casing 1, to present a neat appearance to the vanity case.

A suitable spring catch $2^z$ is provided diametrically opposite the hinge $2^b$ to hold the cover in closed position when the same is shut.

The interior of casing 1 is adapted to hold a quantity of face powder and the bottom of the casing is normally closed by means of an annular frame 4, which is preferably L-shaped in cross section, and adapted to make a tight sliding fit within the open lower end of casing 1, frame member 4 being of less depth than the casing 1.

The open bottom of the annular L-shaped frame member 4 is normally closed by means of a circular plate 5 which is preferably hinged to the under-side of frame 4, as at $5^a$, and diametrically opposite the hinge $5^a$ is a spring catch $5^b$ whereby when the plate 5 is pressed upwardly against the frame 4 the same will be held in such position. The interior of casing 1 is preferably filled with powder by turning the vanity case upside down, opening the hinged plate 5, and after filling the compartment, again closing plate 5. The casing 1 may be thus filled, from time to time, with face or talcum powder, or the like, as its contents are exhausted.

In the center of plate 5 is a circular recess $5^c$, preferably shallow, adapted to receive a circular rotatable disk 6, hereinafter described, and around the upper edge of the recess $5^c$ is an annular shoulder $5^d$ adapted to receive a circular plate 7, which is preferably soldered, or otherwise fixedly secured on said annular shoulder $5^d$. The parts $5^c$, $5^d$, 6 and 7 are so proportioned that the disk 6 will fit snugly, yet rotatably within the recess 5ᶜ, and when so placed the plate 7 will contact with the upper face of said disk 6, as shown in Figure 3.

The plate 7 is provided with a plurality of perforations 7ᵃ, disposed on two, or more, pitch circles whose centers are the center of the plate 7, said circles being of different diameters, and the perforations on said pitch circles being preferably equally spaced from center to center, and through which perforations the powder may pass from the interior of the casing 1 into a powder puff compartment, hereinafter described.

Disk 6 is provided with perforations 6ᵃ adapted to normally register with the perforations 7ᵃ in plate 7, whereby said perforations 7ᵃ in disk 6 will be normally filled with powder from the casing 1. The bottom of recess 5ᶜ is likewise provided with perforations 5ˣ which are disposed out of line with the perforations 7ᵃ of plate 7 but which are adapted to register with the perforations 6ᵃ in disk 6 when the latter is rotated through a slight angle, thereby permitting the powder which is contained in perforations 6ᵃ to pass through perforations 5ˣ, and into the powder-puff compartment immediately below.

As shown in Figures 2, 4 and 5, the disk 6 is rotatable within the recess 5ᶜ, and has an extension 6ᵇ projecting through a slot 5ʸ in the side of recess 5ᶜ, said slot being of such length that when the extension 6ᵇ is is at one end thereof the perforations in disk 6 register with the perforations in plate 7, but when extension 6ᵇ is at the opposite end of slot 5ʸ the perforations 6ᵃ in disk 6 will register with the perforations 5ˣ in member 5ᶜ.

Spring means are provided for normally maintaining disk 6 in such position that the perforations 6ᵃ thereof register with those of the plate 7, said means comprising a pin 8, passing through central perforations in the members 5ᶜ, 6 and 7, said pin 8 being riveted as shown against the upper face of plate 7 and lower face of member 5ᶜ so as to be non-rotatable. At the middle of pin 8 is a slot 8ᵃ, through which passes a flat spring 8ᵇ housed within an enlarged slot 6ᶜ in the disk 6 so that only the ends of spring 8ᵇ engage the disk 6. By the above construction, when disk 6 is rotated by moving extension 6ᵇ, the spring 8ᵇ will be stressed, as indicated in dotted lines in Figure 5, so that when extension 6ᵇ is released the spring 8ᵇ will cause disk 6 to resume its normal position, in which the perforations 6ᵃ thereof register with the perforations 7ᵃ of plate 7. The above construction provides a simple and efficient means for spring operating the disk 6.

The powder-puff compartment comprises a member 9, similar to and of same dimensions as cover 2, said member 9 being hinged as at 9ᵃ to the bottom of the casing 1, as shown directly below hinge 2ᵃ of cover 2. The sides 9ᵇ of member 9 are disposed so as to be flush with the sides of the casing 1, the lower edge of the casing 1 being provided with in-set portion 1ᶻ, adapted to receive the sides 9ᵇ of member 9 when the latter is closed. Within the powder-puff compartment is a powder-puff Q, directly below the perforations 5ˣ of member 5ᶜ and adapted to receive the powder discharged from casing 1 as the disk 6 is actuated. Member 9 is provided with a spring catch 9ᶻ diametrically opposite the hinge 9ᵃ, and directly below the spring catch 2ᶻ of cover 2.

My vanity case may be made of size suitable to fit the palm of the hand, and may be constructed of pressed brass sheeting finished in gold, gun-metal, silver, and the like, in a similar manner to other vanity cases now on sale.

I claim:—

1. A vanity case, comprising a closed body portion having a filling opening; a pair of relatively fixed parallel perforated plates adapted to close said opening; a member rotatably mounted between said fixed plates, and having perforations therein normally registering with the perforations in one of said plates, and adapted to register with the perforations in the other plate only when the member is rotated; and means for returning said member to normal position.

2. In a vanity case as set forth in claim 1, said means comprising a fixed member disposed on the axis of said disk; said disk having a central slot therein; and a flat spring transfixing said fixed member and having its ends engaging said disk, whereby as the disk is rotated the spring will be stressed.

3. A vanity case, comprising a closed body portion; having a filling opening; a pair of relatively fixed parallel perforated plates adapted to close said opening; a disk rotatably mounted intermediate said fixed plates, and having perforations therein normally registering with the perforations in the inner plate, and adapted to register with the perforations in the outer plate only when the disk is rotated; and means for returning said disk to normal position.

4. In a vanity case as set forth in claim 3, said means comprising a fixed pin disposed on the axis of said disk; said disk having a central slot; and a flat spring transfixing said pin and having its ends engaging said disk, whereby as the disk is rotated the spring will be stressed.

5. A vanity case, comprising a closed body portion; having a filling opening in its lower face; a member hingedly attached to the lower face and adapted to close said opening, said member including a pair of parallel perforated plates; a disk rotatably mounted intermediate said plates, and having perforations therein normally registering with the perforations in one plate, and adapted to register with the perforations in the other plate only when the disk is rotated; and spring means for returning said disk to normal position.

6. In a vanity case as set forth in claim 5, said means comprising a fixed pin disposed on the axis of said disk; said disk having an enlarged slot at its center; and a flat spring transfixing said pin and having its ends engaging said disk, whereby as the disk is rotated the spring will be stressed.

7. A vanity case, comprising a closed body portion; having a filling opening in its lower face; a member hingedly attached to the lower face and adapted to close said opening; said member including a pair of parallel perforated plates; a disk rotatably mounted intermediate said plates, and having perforations therein normally registering with the perforations in one plate, and adapted to register with the perforations in the other plate only when the disk is rotated; spring means for returning said disk to normal position; and a puff compartment hingedly attached to the under side of said body portion.

8. In a vanity case as set forth in claim 7, said means comprising a fixed pin disposed on the axis of said disk; said disk having an enlarged slot at its center; and a spring transfixing said pin and having its ends engaging said disk, whereby as the disk is rotated the spring will be stressed.

9. A vanity case, comprising a closed body portion having a rouge pocket in its upper face; a hinged cover therefor; said body having a filling opening in its lower face; a member hingedly attached to the lower face of said body and adapted to close said opening, said member including a pair of parallel perforated plates; a disk rotatably mounted intermediate said plates, and having perforations therein normally registering with the perforations in the inner plate, and adapted to register with the perforations in the outer plate when the disk is rotated; spring means for returning said disk to normal position; and a puff compartment hingedly attached to the underside of said body portion.

10. In a vanity case as set forth in claim 9, said means comprising a fixed pin disposed on the axis of said disk; said disk having an enlarged slot at its center; and a spring transfixing said pin and having its ends engaging said disk, whereby as the disk is rotated the spring will be stressed.

11. A vanity case, comprising a normally closed body portion having a rouge pocket in its upper face; a cover hingedly attached to said body portion; a mirror on the underside of said cover; said body portion having a filling opening in its lower face; a member hingedly attached to the underside of said body portion and adapted to close said opening, said member including a pair of parallel perforated plates; a disk rotatably mounted intermediate said plates, and having perforations therein normally registering with the perforations in the inner plate, and adapted to register with the perforations in the outer plate when the disk is rotated; spring means for returning said disk to normal position; and a puff compartment hingedly attached below said body portion.

12. In a vanity case as set forth in claim 11, said means comprising a fixed pin disposed on the axis of said disk; said disk having an enlarged slot at its center; and a spring transfixing said pin and having its ends engaging said disk, whereby as the disk is rotated the spring will be stressed.

13. A vanity case comprising a body portion having a filling opening; a pair of fixed parallel plates adapted to close said opening; a perforated member movably mounted between said plates; means for yieldably retaining said member in normal position; one of said plates having perforations therein normally registering with those in said member; and the other plate having perforations therein adapted to register with those in said member when the member is shifted.

14. A vanity case comprising a closed body portion having a filling opening; a removable closure for said opening including a pair of fixed parallel plates; a perforated member movably mounted between said plates; means for yieldably retaining said member in normal position; one of said plates having perforations therein normally registering with those in said member; and the other plate having perforations therein adapted to register with those in said member when the member is shifted.

15. A vanity case comprising a body portion having a filling opening; a pair of fixed parallel plates adapted to close said opening; a perforated disk rotatably mounted between said plates; one of said plates having perforations therein normally registering with those in said disk; the other plate having perforations therein adapted to register with those in said disk when the disk is rotated; said disk having a central recess; a fixed member extending into said recess; and a flat spring extending from said member within the recess and having its end engaging the disk, for yieldably retaining the disk in normal position.

16. A vanity case comprising a closed body portion having a filling opening; a hinged closure for said opening including a pair of fixed parallel plates adapted to close said opening; a perforated disk rotatably mounted between said plates; the inner plate having perforations therein normally registering with those in said disk; and the outer plate having perforations therein adapted to register with those in said disk when the disk is rotated; said disk having a central slot; a fixed pin extending through said slot; and a flat spring transfixing said pin within the slot and having its ends engaging the disk for yieldably retaining the disk in normal position.

In testimony that I claim the foregoing as my own, I affix my signature.

RAE SOMMER.